Patented June 14, 1949

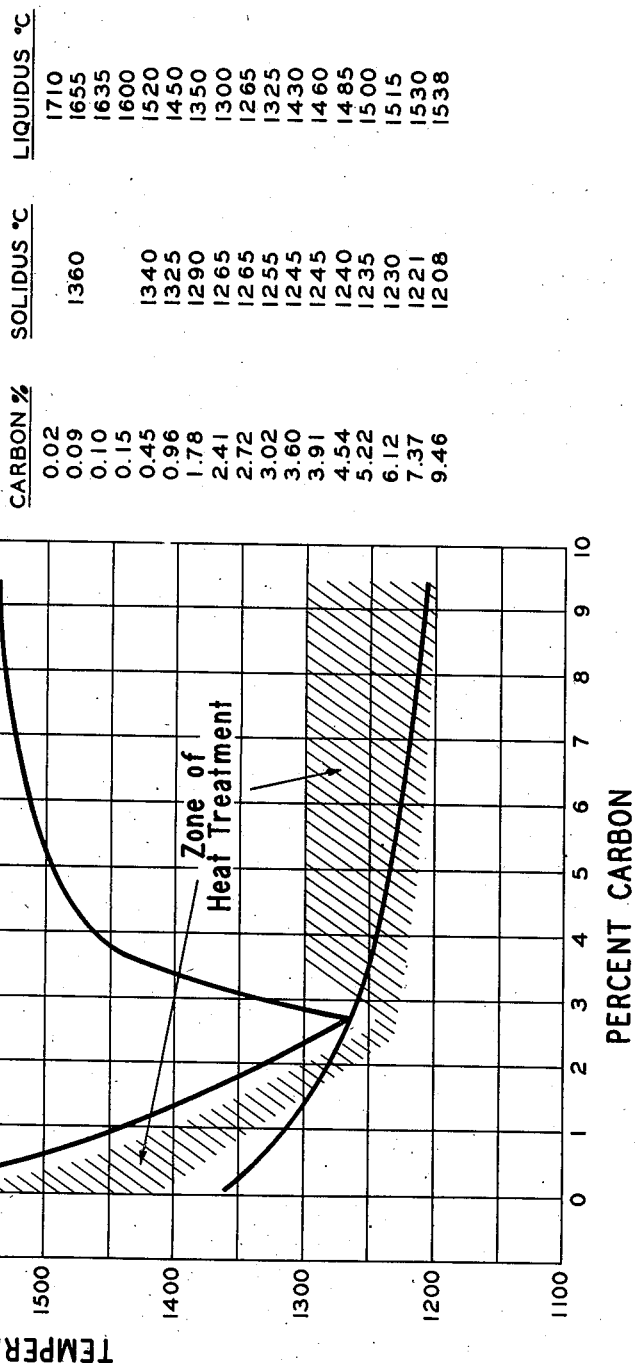

UNITED STATES PATENT OFFICE 2,473,021

PRODUCTION OF LOW CARBON FERROCHROMIUM

Howard R. Spendelow, Jr., Kenmore, and Hendrik de W. Erasmus, Lewiston, N. Y., assignors, by mesne assignments, to Union Carbide and Carbon Corporation, a corporation of New York Application May 26, 1948, Serial No. 29,256

4 Claims. (Cl. 75—28)

The invention relates to the production of ferrochromium, an alloy of iron and chromium in which the content of chromium preferably is within the range of 65% to 75% but may vary within the broader range of 50% to 90%. More particularly the invention relates to the production of low-carbon ferrochromium by the vacuum decarburization of high-carbon ferrochromium in the solid state.

In the production of many chromium-containing iron alloys it is highly desirable to employ ferrochromium having a low content of carbon. In the present state of the art ferrochromium of low-carbon content is prepared by a silicon reduction process. The raw materials employed consist primarily of chromium ore, silicon or a silicon alloy, and fluxing agents. The manufacturing operation is conducted in the molten state, generally in an open-arc electric furnace. The reduction of the chromium ore proceeds in accordance with the following equation:

$$FeOCr_2O_3 + 2Si = 2Cr + Fe + 2SiO_2$$

According to the present invention low-carbon ferrochromium is prepared by vacuum decarburization of high-carbon ferrochromium with an oxidant, both being in the solid state. Among oxidants which may be employed are metal oxides such as chromium oxide, iron oxide, and manganese oxide, or oxygen-bearing salts such as carbonates. When it is desired to remove sulfur as well as carbon from the high-carbon ferrochromium, silica may be used as the oxidant or as an addition to the oxidant.

In the production of low-carbon ferrochromium according to the invention, high-carbon ferrochromium and the selected oxidant material are first comminuted to extreme fineness i. e. preferably below 30 microns particle size and then thoroughly mixed. The amount of oxidant should be at least equal to and preferably in slight excess of that required to supply the necessary oxygen to react with and remove as gas the desired amount of carbon from the high-carbon ferrochromium.

After mixing, the charge is preferably pelleted or otherwise converted into compressed lump form. Pelleting of the charge provides excellent contact between reacting particles and also the necessary interstitial space for the escape of reaction gases as well as a convenient form for handling the material. Bonding agents such as chromic acid and water may be advantageously employed in the formation of pellets. The pellets may then be charged into any suitable vacuum furnace and heated in vacuo or under reduced pressure until carbon is eliminated from the high-carbon ferrochromium to the desired extent.

In the vacuum decarburization of high-carbon ferrochromium by reaction with an oxidant in the solid state high rates of reaction are desirable to decrease the total furnacing time. This condition may be achieved by increasing the temperature of the reacting materials. However, a limitation is imposed by the incipient melting temperature of the high-carbon ferrochromium employed in the pellets. Initial furnace temperatures above the incipient melting temperature result in partial fusion of the charge, thus bringing the reaction to a premature conclusion by sealing the interstitial regions of the pellets and blocking the escape of evolved carbon monoxide gas.

The object of the present invention is to provide a heating cycle for use in vacuum decarburization of high-carbon ferrochromium by reaction with an oxidant in the solid state, which heating cycle promotes rapid reaction without blocking the escape of reaction gases.

In the single figure of the drawing, a typical constitutional diagram of commercial ferrochromium of the 70% chromium grade is shown. It will be noted in this diagram that the eutectic is located at about 2.7% carbon and that the eutectic melting temperature is about 1265° C.

When 70% grade, a high-carbon ferrochromium-oxidant pellets are heated at temperatures above 1265° C. but below 1300° C., the outer surfaces of the pellets are decarburized more rapidly than the interior, and when the carbon content is decreased to about 2.7%, the surface of the pellets fuses forming a skin which prevents further effective decarburization of the interior. The interior of pellets after such treatment appears to have approached fusion and to be composed of stone-like unreacted mix. To avoid this objectionable effect, the pellets may be decarburized at temperatures below 1265° C. but at these lower temperatures the time of the decarburization treatment is undesirably prolonged.

The present invention is based upon the discovery that by controlled variation of the temperature the reaction may be greatly expedited without impairing effective decarburization of the pellets, the variation in temperature being a function of the carbon content throughout the treatment. The ferrochromium-carbon constitutional diagram discloses that the temperature of the solidus curve rises as the carbon content is lowered and rises sharply when the carbon content falls below the eutectic composition. Thus, the temperature of the charge may be increased as decarburization proceeds, without danger of fusion, provided the solidus temperature is not exceeded to a material extent. In practice, the temperature of treatment may be somewhat above the solidus curve during the initial stages of decarburization. As the eutectic carbon content is approached the temperature must be dropped to below the melting point of the material. After the carbon content falls below the eutectic content the temperature may again exceed the temperature of the solidus curve and in the last stages of the reaction, at low concentrations of carbon, may even approach the temperature of the liquidus curve. This increase in temperature in the latter stages is possible because the residual high-carbon content material, if fused at that time, would be insufficient to occupy the interstitial space in the pellets and thus effectively prevent decarburization It has been found, for example, with 70% grade high-carbon ferrochromium-oxidant pellets that in the initial stages of the decarburization treatment, when the carbon content of the ferrochromium in every portion of the charge is higher than the eutectic composition (about 2.7% carbon), the solidus temperature may be exceeded up to a maximum temperature of about 1300° C., without causing sufficient partial fusion to close the interstices and destroy the porosity of the pellets. As the carbon content on the surface of the pellets approaches the eutectic, the temperature becomes critical due to the relatively sharp melting point of the material and the temperature of treatment should be dropped below the eutectic temperature (about 1265° C.). Since the pellets are decarburized progressively at different rates in different portions of the charge, heating must be maintained at temperatures below 1265° C. (or the corresponding eutectic melting temperature for other compositions) until the carbon content of the portions of the charge, which follow the furnace temperature closely, are everywhere below the eutectic composition, at which point the furnace temperature may again be increased to above the solidus curve and at low concentration of carbon, the temperature of the liquidus curve may be approached due to the decreased proportion of the lower melting point constituent. Care should be taken, however, to raise the temperature in this latter stage at a rate sufficiently slow so that incipient fusion will not prevent continued decarburization of the charge.

What is claimed is:

1. In the vacuum decarburization of high-carbon ferrochromium-oxidant pellets in the solid state, the improvement which comprises heating said pellets in the vicinity of the solidus temperature of the ferrochromium in said pellets until the composition of said ferrochromium approaches the eutectic concentration of carbon; adjusting the temperature of said pellets to below the melting point of said eutectic composition and maintaining said temperature until the carbon in said ferrochromium is below the eutectic composition and thereafter heating said pellets at a temperature above the solidus temperature and below the liquidus temperature of said ferrochromium at a rate insufficient to destroy the porosity in said pellets by partial fusion.

2. In the vacuum decarburization of 65% to 75% grade high-carbon ferrochromium-oxidant pellets in the solid state, the improvement which comprises heating said pellets at a temperature above the solidus temperature of said high-carbon ferrochromium but not exceeding about 1300° C. until the concentration of carbon in said ferrochromium approaches about 2.7%; lowering the temperature to below 1265° C. until the concentration of carbon in said ferrochromium falls below about 2.7% and thereafter increasing said temperature to within the range of between 1300° C. and below the liquidus temperature of said ferrochromium at a rate insufficient to destroy the porosity in said pellets by partial fusion.

3. In the vacuum decarburization of a bed of high-carbon ferrochromium-oxidant pellets in the solid state, the improvement which comprises heating said bed of pellets and maintaining the temperature of the exposed pellets in said bed in the vicinity of the solidus temperature of the ferrochromium in said pellets until the composition of said ferrochromium approaches the eutectic concentration of carbon; adjusting the temperature of said exposed pellets to below the melting point of said eutectic composition and maintaining said temperature until the carbon in said ferrochromium is below the eutectic composition and thereafter adjusting the temperature of said exposed pellets to above the solidus temperature and below the liquidus temperature of said ferrochromium at a rate insufficient to destroy the porosity in said exposed pellets by partial fusion.

4. In the vacuum decarburization of a bed of 65% to 75% grade high-carbon ferrochromium-oxidant pellets in the solid state, the improvement which comprises heating said bed of pellets and maintaining the temperature of the exposed pellets in said bed at above the solidus temperature of said high-carbon ferrochromium but not exceeding about 1300° C. until the concentration of carbon in said ferrochromium approaches 2.7%; lowering the temperature of said exposed pellets to below 1265° C. until the concentration of carbon in said ferrochromium falls below about 2.7% and thereafter adjusting the temperature of said exposed pellets to within the range of between 1300° C. and below the liquidus temperature of said ferrochromium at a rate insufficient to destroy the porosity in said exposed pellets by partial fusion.

HOWARD R. SPENDELOW, Jr.
HENDRIK de W. ERASMUS.

No references cited.